United States Patent
Zheng et al.

(10) Patent No.: US 11,113,509 B2
(45) Date of Patent: Sep. 7, 2021

(54) IDENTITY DETERMINATION SYSTEM AND METHOD

(71) Applicants: OPPLE LIGHTING CO., LTD., Shanghai (CN); SUZHOU OPPLE LIGHTING CO., LTD., Suzhou (CN)

(72) Inventors: Tianhang Zheng, Shanghai (CN); Yang Hu, Shanghai (CN); Wanghui Yan, Shanghai (CN); Wei Wang, Shanghai (CN); Bin Lin, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 16/910,040

(22) Filed: Jun. 23, 2020

(65) Prior Publication Data

US 2020/0320277 A1    Oct. 8, 2020

Related U.S. Application Data

(63) Continuation of application No. PCT/CN2018/122883, filed on Dec. 21, 2018.

(30) Foreign Application Priority Data

Dec. 27, 2017    (CN) .......................... 201711446279.6
Dec. 27, 2017    (CN) .......................... 201721872711.3

(51) Int. Cl.
   *G06K 9/00*    (2006.01)
(52) U.S. Cl.
   CPC ..... *G06K 9/00255* (2013.01); *G06K 9/00268* (2013.01); *G06K 9/00288* (2013.01); *G06K 9/00711* (2013.01)

(58) Field of Classification Search
   CPC ........... G06K 9/00255; G06K 9/00268; G06K 9/00288; G06K 9/00711
   See application file for complete search history.

(56) References Cited

U.S. PATENT DOCUMENTS 9,589,181 B2 *   3/2017   Ito ......................... G06F 16/583
10,452,897 B1 * 10/2019   Benkreira .......... G06K 9/00268
(Continued)

FOREIGN PATENT DOCUMENTS

CN     106886746 A     6/2017
CN     107358160 A    11/2017
(Continued)

OTHER PUBLICATIONS

International Search Report of PCT Application No. PCT/CN2018/122883 dated Mar. 21, 2019, (4p).

*Primary Examiner* — Md K Talukder
(74) *Attorney, Agent, or Firm* — Arch & Lake LLP

(57) ABSTRACT

An identity determination system and an identity determination method are provided. The system includes: a computing node including an image acquisition device, and a server in communication connection with the computing node. The computing node is configured to: collect, by using the image acquisition device, an image according to a preset image collecting frequency; perform face recognition on the collected image to recognize a facial feature in the image; determine node identity information corresponding to the recognized facial feature according to the recognized facial feature; and upload the facial feature and the node identity information corresponding to the facial feature to the server. The server is configured to determine an identity of the facial feature based on the facial feature and the node identity information corresponding to the facial feature uploaded by the computing node.

20 Claims, 3 Drawing Sheets

(56) References Cited

U.S. PATENT DOCUMENTS

| | | | |
|---|---|---|---|
| 2005/0198661 A1* | 9/2005 | Collins | G06Q 30/02 |
| | | | 725/19 |
| 2009/0169067 A1* | 7/2009 | Chang | G06K 9/00295 |
| | | | 382/118 |
| 2017/0171613 A1* | 6/2017 | Xu | H04N 21/4122 |
| 2017/0300823 A1* | 10/2017 | Bostick | G06Q 50/01 |
| 2018/0068173 A1* | 3/2018 | Kolleri | G06F 16/29 |
| 2018/0069937 A1* | 3/2018 | Kolleri | G06Q 10/1093 |
| 2020/0320277 A1* | 10/2020 | Zheng | G06K 9/00255 |

FOREIGN PATENT DOCUMENTS

| | | |
|---|---|---|
| CN | 108009530 A | 5/2018 |
| CN | 207764814 U | 8/2018 |

\* cited by examiner

IDENTITY DETERMINATION SYSTEM AND METHOD

CROSS-REFERENCE TO RELATED APPLICATIONS

This application is based upon and claims the priority of PCT patent application No. PCT/CN2018/122883 filed on Dec. 21, 2018 which claims priority to the Chinese patent application No. 201711446279.6 filed on Dec. 27, 2017 and the Chinese patent application No. 201721872711.3 filed on Dec. 27, 2017, the entire content of all of which is hereby incorporated by reference herein for all purposes.

TECHNICAL FIELD

The present disclosure relates to the field of information processing technology, in particular to an identity determination system and an identity determination method.

BACKGROUND

Positioning with ibeacon low-energy Bluetooth technology may only provide simple position information, and may not provide detailed analysis data. As image processing technology becomes more and more mature, there are more and more applications of this type of business. Especially, face recognition, when applied to the statistics of passenger flow in a shopping mall and the hot spot detection of shops in the shopping mall, is of great value.

SUMMARY

The present disclosure provides an identity determination system, an identity determination method adapted for a computing node and an identity determination method adapted for a server.

The examples of the present disclosure provide an identity determination system. The system may include a computing node that includes an image acquisition device, and a server in communication connection with the computing node. The computing node may be configured to: collect, by using the image acquisition device, an image according to a preset image collecting frequency; perform face recognition on the collected image to recognize a facial feature in the image; determine node identity information corresponding to the recognized facial feature according to the recognized facial feature; and upload the facial feature and the node identity information corresponding to the facial feature to the server. The server may be configured to determine an identity of the facial feature based on the facial feature and the node identity information corresponding to the facial feature uploaded by the computing node.

The examples of the present disclosure also provide an identity determination method adapted for a computing node that may include an image acquisition device. The method may include: using the image acquisition device to collect an image according to a preset image collecting frequency; performing face recognition on the collected image to recognize facial feature in the image, and determining node identity information corresponding to the recognized facial feature according to the recognized facial feature; and uploading the facial feature and the node identity information corresponding to the facial feature to the server, so that the server determines an identity of the facial feature based on the facial feature and the node identity information corresponding to the facial feature uploaded by the computing node.

The examples of the present disclosure further provide an identity determination method adapted for the server. The method may include: receiving a facial feature and node identity information corresponding to the facial feature uploaded by a computing node comprising an image acquisition device, where the computing node may use the image acquisition device to collect an image according to a preset image collecting frequency; performing face recognition on the collected image to recognize a facial feature in the image, and determining node identity information corresponding to the recognized facial feature according to the recognized facial feature; uploading the facial feature and the node identity information corresponding to the facial feature to the server; and determining an identity of the facial feature based on the facial feature and the node identity information corresponding to the facial feature uploaded by the computing node.

It is to be understood that both the foregoing general description and the following detailed description are exemplary and explanatory only and are not restrictive of the present disclosure.

BRIEF DESCRIPTION OF THE DRAWINGS

By reading the detailed description of the examples in the following, various other advantages and benefits will become clear and apparent to those skilled in the art. The drawings are only for the purpose of illustrating the examples, and thus are not limitative of the present disclosure. Furthermore, the same reference numerals are used to refer to the same elements throughout the drawings. In the drawings.

DETAILED DESCRIPTION

Figure 1:
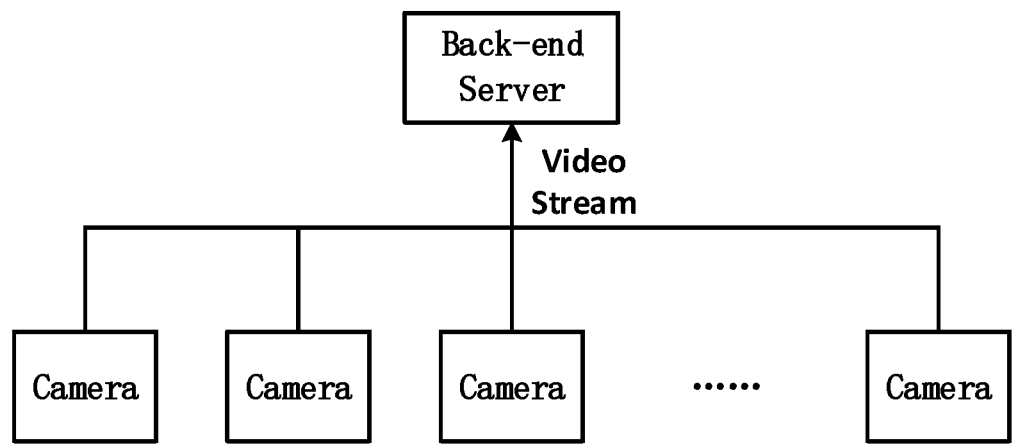
FIG. 1 is a schematic diagram of a system architecture of hot spot analysis and movement trajectory tracking in the prior art.

Examples of the present disclosure are described in more detail with reference to the drawings. Although examples of the present disclosure are illustrated in the drawings, it should be understood that the present disclosure can be implemented in various forms and should not be limited by the example set forth herein. Rather, these example are provided to enable a more thorough understanding of the present disclosure and to fully convey the scope of the present disclosure to those skilled in the art.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The statistics of passenger flow in the shopping mall and passenger movement trajectory tracking may be based on face recognition technology. Because face recognition requires high computing capability, the recognition speed can be improved by sending the video stream captured by the camera to the back-end server for face recognition, and after receiving the video stream, the back-end server analyzes the information in the video, identifies and extracts relevant feature values for storage and comparison, and then displays the relevant analysis information. The architecture diagram is as illustrated in FIG. 1.

However, the problem with the system illustrated in FIG. 1 is that the video stream is an application that occupies bandwidth. When there are too many nodes, the network load is large, which has a great impact on the stability and accuracy of the system, and the back-end server also may have the problem of insufficient computing resources when analyzing multi-channel video stream. In addition, when the video stream is uploaded to the back-end server, it also involves user privacy issues. Therefore, these problems require to be solved.

Figure 2:
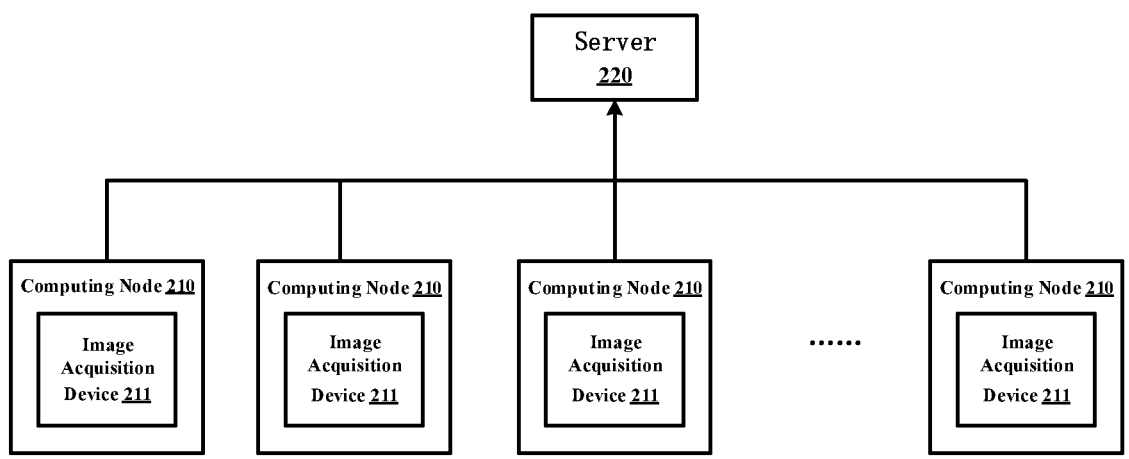
FIG. 2 is a schematic structural diagram of an identity determination system according to an embodiment of the present disclosure.

In order to solve the technical problems, the examples of the present disclosure provide an identity determination system. The identity determination system improves the efficiency and security of the system through the distributed computation of the computing node and the server. As illustrated in FIG. 2, the identity determination system provided by the examples of the present disclosure may include a computing node 210, and a server 220 in communication connection with the computing node 210.

The computing node 210 includes an image acquisition device 211, and is used to, by using the image acquisition device 211, collect images according to a preset image collecting frequency, perform face recognition on the collected images to recognize facial features in the images, determine node identity information corresponding to the facial features according to the recognized facial features, and upload the facial features and the node identity information corresponding to the facial features to the server 220.

The server 220 is used to determine an identity of the facial features based on the facial features and the node identity information corresponding to the facial features uploaded by the computing node 210.

It should be noted that the number of computing nodes 210 in the identity determination system provided by the examples of the present disclosure may be one or more, and four computing nodes 210 in FIG. 2 are only illustrative and are not limitative of the examples of the present disclosure.

In an optional embodiment of the present disclosure, the preset image collecting frequency can be set or adjusted according to actual requirements. For example, the preset image collecting frequency can be collecting 3 frames of images per second, or collecting 4 frames of images per second, and the examples of the present disclosure are not limited in this aspect.

In an optional embodiment of the present disclosure, the computing node 210 performs face recognition on the collected image to recognize the facial features in the image. The face recognition algorithm can be used to perform face recognition on the collected image. After detecting the face and locating the key feature points of the face, the computing node 210 extracts the face area for preprocessing, and extracts the facial features, such as center coordinates of the face, positions of facial features, face shape, angle, etc.

In an optional embodiment of the present disclosure, when the computing node 210 determines the node identity information corresponding to the facial features according to the recognized facial features, the computing node 210 is used to:

in a correspondence between facial features and node identity information, use the recognized facial features to match the facial features in the correspondence, so as to obtain a matching result;

in the case where the matching result is that there are matched facial features in the correspondence, determine node identity information corresponding to the matched facial features in the correspondence as the node identity information corresponding to the recognized facial features; and in the case where the matching result is that there are no matched facial features in the correspondence, assign new node identity information different from the node identity information contained in the correspondence, determine the new node identity information as the node identity information corresponding to the recognized facial features, and record the new node identity information and corresponding facial features in the correspondence.

The node identity information here includes the identifier of the computing node, and represents the identity information of the facial features on the computing node, that is, the correspondence on each node is independently generated and stored. For example, the computing node 210 in the identity determination system includes computing nodes A, B, C, and D. Assuming that facial features a are recognized from the images collected by computing nodes A and B, the corresponding node identity information of the facial features a on the computing node A is node A-a, and the corresponding node identity information of the facial features a on the computing node B is node B-a. Table 1 below illustrates the correspondence between the facial features of the computing node A and the node identity information, and similarly, computing nodes B, C, and D also have correspondence tables illustrated similar to Table 1. It should be noted that the examples here are only schematic and are not limitative of the examples of the present disclosure.

TABLE 1

Correspondence table of facial features of computing node A and node identity information

| Node identity information | Facial features |
| --- | --- |
| Node A-a | a |
| Node A-b | b |
| Node A-c | c |
| ... | ... |

In an optional embodiment of the present disclosure, if facial features in the correspondence and the recognized facial features have a matching degree greater than a preset threshold, it is determined that there are matched facial features in the correspondence. Otherwise it is determined that there are no matched facial features in the correspondence. The preset threshold here can be set according to actual requirements. For example, the matching degree ranges from 0 to 100, and the preset threshold can be 75, 80, or the like. It should be noted that the examples here are only illustrative and are not limitative of the examples of the present disclosure.

In an optional embodiment of the present disclosure, when performing face recognition on the collected image, if the computing node 210 detects a plurality of faces in the image, the computing node 210 starts a plurality of worker threads with the same number as the plurality of faces; and the computing node 210 uses the plurality of worker threads to recognize facial features of each of the plurality of faces in the image, and determines node identity information corresponding to the facial features according to the recognized facial features, where one worker thread recognizes facial features of one face. According to the recognized facial features, the node identity information corresponding to the facial features is determined. In this way, parallel operation of the plurality of worker threads can improve the processing efficiency of the computing node, thereby improving the processing efficiency of the entire identity determination system.

In an optional embodiment of the present disclosure, the computing node 210 may upload the facial features and the node identity information corresponding to the facial features to the server 220 in real time, the computing node 210 uploads the facial features and the node identity information corresponding to the facial features to the server 220 in real time after determining the node identity information corresponding to the facial features.

In an optional embodiment of the present disclosure, when the computing node 210 uploads the facial features and the node identity information corresponding to the facial features to the server 220, the computing node 210 may also upload according to the preset upload frequency, the computing node 210 stores the facial features and the node identity information corresponding to the facial features locally after determining the node identity information corresponding to the facial features; and the computing node 210 uploads the facial features and the node identity information corresponding to the facial features stored locally to the server 220 according to the preset upload frequency.

The preset upload frequency here can be set according to actual requirements. For example, the preset upload frequency can be uploading every 1 minute or every 2 minutes. It should be noted that the examples here are only illustrative and are not limitative of the examples of the present disclosure.

In an optional embodiment of the present disclosure, the computing node 210 is further used to upload the facial features and the node identity information corresponding to the facial features stored locally to the server 220 according to the preset upload frequency, and the facial features and the node identity information corresponding to the facial features uploaded to the server 220 are deleted locally. In this way, local storage space can be saved.

In an optional embodiment of the present disclosure, the computing node 210 is further used to upload the facial features and the node identity information corresponding to the facial features stored locally to the server 220 according to the preset upload frequency, and generate an upload log, so that subsequent facial features and node identity information corresponding to the facial features which are stored locally and non-uploaded to the server 220 are uploaded to the server 220 according to the upload log. In this way, the problem of repeated upload can be avoided, transmission resources can be saved, and the processing efficiency of the server can be improved.

In an optional embodiment of the present disclosure, after determining the node identity information corresponding to the facial features, the computing node 210 may store the node identity information, time of occurrence of the node identity information, and center coordinates of the face corresponding to the node identity information in a local node log table. By taking the above computing nodes A, B, C, and D as an example, Table 2 below illustrates the node log table of the computing node A. Similarly, computing nodes B, C, and D also have node log tables illustrated similar to Table 2. It should be noted that the examples here are only illustrative and are not limitative of the examples of the present disclosure.

TABLE 2

| Node log table of computing node A | | |
|---|---|---|
| Node identity information | Time of occurrence | Face center coordinates |
| Node A-a | t1 | q1 |
| Node A-b | t2 | q2 |
| Node A-a | t3 | q3 |
| Node A-a | t4 | q1 |
| ... | ... | ... |

Further, the node log table stored locally can be provided for subsequent use. For example, the problem that different node identity information may be determined when a person is within the specified range of the same location point due to the angle of face and the light is solved. For another example, the valid identity information in the node identity information corresponding to a single node can be determined, so as to be used for statistics of users staying in the scene when applied to an actual scene, and so on. Details are described in the following.

In an optional embodiment of the present disclosure, in solving the problem that different node identity information may be determined when the person is within the specified range of the same location point due to the angle of face and the light:

if there is different node identity information in the node log table, the different node identity information is recorded as first node identity information and second node identity information, so that the computing node 210 is further used to:

query face center coordinates and time of occurrence corresponding to the first node identity information and face center coordinates and time of occurrence corresponding to the second node identity information from the node log table;

determine whether an offset of the face center coordinates corresponding to the second node identity information with respect to the face center coordinates corresponding to the first node identity information is less than a preset number of pixels; and if yes, and frames of the second node identity information between identical first node identity information are less than preset frames, determine the first node identity information and second node identity information as substantially identical node identity information and record in a node identity information consolidation table.

The preset number here can be set according to actual requirements, such as 10, etc.; and the number of preset frames can also be set according to actual requirements, such as 4, etc. It should be noted that the examples here are only illustrative and are not limitative of the examples of the present disclosure.

By taking the above computing nodes A, B, C, and D as an example, Table 3 below illustrates a node identity information consolidation table of the computing node A. In Table 3, node A-a, node A-c, and node A-e are substantially identical node identity information; and node A-b and node A-d are substantially identical node identity information. Similarly, the computing nodes B, C, and D also have node identity information consolidation tables illustrated similar to Table 3. It should be noted that the examples here are only illustrative and are not limitative of the examples of the present disclosure.

TABLE 3

Node identity information consolidation table of computing node A
Substantially identical node identity information

| Node A-a | Node A-c | Node A-e | ... |
| Node A-b | Node A-d | ... | ... |
| ... | ... | ... | ... |

In an optional embodiment of the present disclosure, if the number of computing nodes 210 is one, the computing node 210 may upload its own node log table to the server 220, and the server 220 may determine whether the amount of the node identity information is greater than the preset amount threshold according to the node log table uploaded by the computing node 210. If the amount of the node identity information determined by the computing node 210 within a preset duration T is greater than the preset amount threshold M, the node identity information is determined as valid identity information. For example, if the amount of the node identity information determined within a preset duration of 10 seconds is greater than the preset amount threshold of 7, the node identity information is determined as valid identity information. It should be noted that T and M can be set according to actual requirements, and the examples here are only illustrative and are not limitative of the examples of the present disclosure.

In this way, the server 220 can further count the number of people based on the valid identity information. For example, if the image acquisition device of the computing node 210 is used to collect the image of the mall, the server 220 can count the passenger flow of the mall based on the valid identity information. For another example, the image acquisition device of the computing node 210 is used to collect the image of the shop in the mall, the server 220 can count the passenger flow of the shop in the mall based on the valid identity information. It should be noted that the mall provided here is only illustrative, and the user can dispose the identity determination system provided by the examples of the present disclosure in corresponding scenes according to actual requirements, such as popular attractions, public places, etc., so as to use the identity determination system to implement identity determination, thereby implementing the statistics of the passenger flow of the scene and the hot spot detection according to the determined identity.

In an application scene, when an exhibition or product is displayed, it is usually required to know the attention of visitors to the product or exhibits. Therefore, it is usually required to count the visitors who have stayed, without counting those who have not stayed. It can be implemented by using the identity determination system provided by the examples of the present disclosure, using the image acquisition device of the computing node 210 to collect the image of the exhibition or product on display, performing face recognition on the collected image, recognizing facial features in the image, determining node identity information corresponding to the facial features according to the recognized facial features, and then storing the node identity information, time of occurrence of the node identity information, and face center coordinates corresponding to the node identity information in the local node log table.

The computing node 210 uploads its own node log table to the server 220.

The server 220 may determine whether the amount of the node identity information is greater than the preset amount threshold according to the node log table uploaded by the computing node 210, and if the amount of the node identity information determined by the computing node 210 within the preset duration T is greater than the preset amount threshold M, the node identity information is determined as valid identity information. For example, if the amount of the node identity information determined within a preset duration of 10 seconds is greater than the preset amount threshold of 7, the node identity information is determined as valid identity information. Therefore, the server 220 can count the visitors who have stayed based on the valid identity information.

In an optional embodiment of the present disclosure, if the number of computing nodes 210 is more than one, the server 220 may match the facial features uploaded by the computing nodes with the node identity information corresponding to the facial features to perform node identity information matching between the computing nodes. Still by taking the above example as an example, the node identity information corresponding to the facial features a on the computing node A is node A-a, the node identity information corresponding to the facial features a on the computing node B is node B-a, and the server 220 may determine node identity information node A-a and node B-a as the same person according to the facial features a, and assign unified determination identity information as gid-a. The server 220 can be implemented by the following steps:

assigning identical determination identity information for node identity information of identical facial features and establishing a mapping relationship of the determination identity information, facial features and node identity information, according to facial features and node identity information corresponding to the facial features uploaded by a plurality of computing nodes 210; and querying node identity information substantially identical to each node identity information in the node identity information consolidation table uploaded by the computing nodes according to each node identity information in the mapping relationship, and adding the substantially identical node identity information to the mapping relationship.

Table 4 below illustrates the initial mapping relationship established on the server 220. It should be noted that the examples here are only illustrative and are not limitative of the examples of the present disclosure.

TABLE 4

| Mapping relationship | | | | |
| --- | --- | --- | --- | --- |
| Determination identity information | Facial features | Node identity information | | |
| gid-a | a | Node A-a | Node B-a | ... |
| gid-b | b | Node A-b | ... | ... |
| ... | ... | ... | ... | ... |

Further, according to each node identity information in the mapping relationship illustrated in Table 4, the server 220 may query node identity information substantially identical to each node identity information in the node identity information consolidation table of the computing node A as illustrated in Table 3, and add the substantially identical node identity information to the mapping relationship to obtain the mapping relationship illustrated in Table 5.

TABLE 5

Mapping relationship

| Determination identity information | Facial features | Node identity information | | | |
|---|---|---|---|---|---|
| gid-a | a | Node A-a | Node B-a | Node A-c | Node A-e |
| gid-b | b | Node A-b | Node A-d | ... | |
| ... | ... | ... | ... | ... | |

Similarly, based on each node identity information in the mapping relationship illustrated in Table 4, the server 220 can also query node identity information substantially identical to each node identity information in the node identity information consolidation tables of the computing nodes B, C, and D, and add the substantially identical node identity information to the mapping relationship.

In an optional embodiment of the present disclosure, when the server 220 receives again facial features and node identity information corresponding to the facial features uploaded by any one of the plurality of computing nodes 210, the server 220 can further determine whether there is node identity information identical to the uploaded node identity information in the mapping relationship; if yes, the server 220 determines determination identity information corresponding to the identical node identity information as a determination identity of the uploaded node identity information according to the mapping relationship; and if not, the server 220 assigns new determination identity information different from determination identity information contained in the mapping relationship, determines the new determination identity information as the determination identity of the uploaded node identity information, and records the new determination identity information, the uploaded node identity information and corresponding facial features in the mapping relationship.

In an optional embodiment of the present disclosure, the plurality of computing nodes 210 upload node log tables to the server 220, respectively, and when the server 220 receives again facial features and node identity information corresponding to the facial features uploaded by any one of the plurality of computing nodes 210, according to the node log table of the any one of the plurality of computing nodes, if an amount of the node identity information of the any one of the computing nodes determined within a preset duration is greater than a preset amount threshold, the server 220 determines the node identity information as valid identity information and further determines whether there is node identity information identical to the valid identity information in the mapping relationship; if yes, the server 220 determines determination identity information corresponding to the identical node identity information as a determination identity of the valid identity information according to the mapping relationship; and if not, the server 220 assigns new determination identity information different from determination identity information contained in the mapping relationship, determines the new determination identity information as the determination identity of the valid identity information, and records the new determination identity information, the valid identity information and corresponding facial features in the mapping relationship.

In an optional embodiment of the present disclosure, the server 220 can further determine the validity of the node identity information in the initial mapping relationship established according to the respective node log tables of the plurality of computing nodes 210; if the node identity information is valid, the node identity information is reserved; and if the node identity information is not valid, the node identity information is deleted.

In an optional embodiment of the present disclosure, the server 220 may further query node identity information substantially identical to the node identity information corresponding to the new determination identity information in the node identity information consolidation table according to the node identity information corresponding to the new determination identity information in the mapping relationship, and add the substantially identical node identity information to the mapping relationship.

In this way, the server 220 can further count the number of people based on the determination identity information. For example, the image acquisition devices of the plurality of computing nodes 210 are used to collect the image of the mall, the server 220 can count the passenger flow of the mall based on the determination identity information. For another example, the image acquisition devices of the plurality of computing nodes 210 are used to collect the image of the shop in the mall, the server 220 can count the passenger flow of the shop in the mall based on the determination identity information. It should be noted that the mall provided here is only illustrative, and the user can dispose the identity determination system provided by the examples of the present disclosure in corresponding scenes according to actual requirements, such as popular attractions, public places, etc., so as to use the identity determination system to implement identity determination, thereby implementing the statistics of the passenger flow of the scene and the hot spot detection according to the determined identity.

In an optional embodiment of the present disclosure, distributed management systems based on network can be implemented in the computing node 210 and the server 220, respectively, and the computing node 210 can upload the analysis result of face recognition and analysis of the collected image through the distributed management system, such as the facial features, the node identity information corresponding to the facial features, the coordinate position of the face in the image, time of collecting the image, etc. The examples of the present disclosure are not limited in this aspect.

Figure 3:
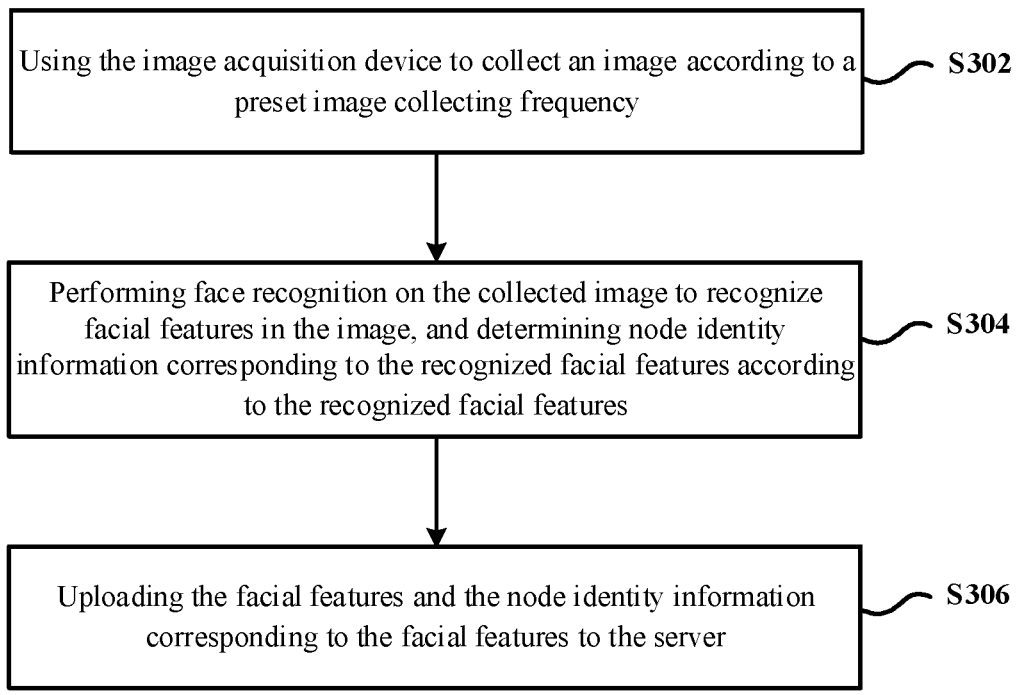
FIG. 3 is a schematic flow chart of an identity determination method adapted for a computing node according to an embodiment of the present disclosure.

Based on the same inventive concept, the examples of the present disclosure further provide an identity determination method. FIG. 3 is a schematic flow chart of an identity determination method adapted for a computing node according to an embodiment of the present disclosure. With reference to FIG. 3, the identity determination method adapted for the computing node including an image acquisition device may include the following steps S302 to S306.

Step S302, using the image acquisition device to collect an image according to a preset image collecting frequency.

Step S304, performing face recognition on the collected image to recognize facial features in the image, and determining node identity information corresponding to the recognized facial features according to the recognized facial features.

In this step, face recognition is performed on the collected image, and if no face is recognized, the image collected by the image acquisition device continues to be acquired, and the image is subjected to face recognition.

Step S306, uploading the facial features and the node identity information corresponding to the facial features to the server, so that the server determines an identity of the facial features based on the facial features and the node identity information corresponding to the facial features uploaded by the computing node.

The preset image collecting frequency mentioned in step S302 above can be set or adjusted according to actual requirements. For example, the preset image collecting frequency can be collecting 3 frames of images per second, or collect 4 frames of images per second, and the examples of the present disclosure are not limited in this aspect.

In an optional embodiment of the present disclosure, face recognition is performed on the collected image in step S304 to recognize the facial features in the image. The face recognition algorithm can be used to perform face recognition on the collected image. After detecting the face and locating the key feature points of the face, the face area is extracted for preprocessing, and the facial features are extracted, such as center coordinates of the face, positions of facial features, face shape, angle, etc.

In an optional embodiment of the present disclosure, determining the node identity information corresponding to the recognized facial features according to the recognized facial features in step S304, may include: in a correspondence between facial features and node identity information, using the recognized facial features to match the facial features in the correspondence to obtain a matching result; if the matching result is that there are matched facial features in the correspondence, determining node identity information corresponding to the matched facial features in the correspondence as the node identity information corresponding to the recognized facial features; and if the matching result is that there are no matched facial features in the correspondence, assigning new node identity information different from the node identity information contained in the correspondence, determining the new node identity information as the node identity information corresponding to the recognized facial features, and recording the new node identity information and corresponding facial features in the correspondence.

The node identity information here includes the identifier of the computing node, and represents the identity information of the facial features on the computing node. For example, the computing node in the identity determination system includes computing nodes A, B, C, and D. Assuming that facial features a are recognized from the images collected by computing nodes A and B, the corresponding node identity information of the facial features a on the computing node A is node A-a, and the corresponding node identity information of the facial features a on the computing node B is node B-a. It should be noted that the examples here are only illustrative and are not limitative of the examples of the present disclosure.

In an optional embodiment of the present disclosure, if facial features in the correspondence and the recognized facial features have a matching degree greater than a preset threshold, it is determined that there are matched facial features in the correspondence. Otherwise it is determined that there are no matched facial features in the correspondence. The preset threshold here can be set according to actual requirements. For example, the matching degree ranges from 0 to 100, and the preset threshold can be 75, 80, or the like. It should be noted that the examples here are only illustrative and are not limitative of the examples of the present disclosure.

In an optional embodiment of the present disclosure, when performing face recognition on the collected image in step S304, if a plurality of faces are detected in the image, a plurality of worker threads with the same number as the plurality of faces are started; and the plurality of worker threads are used to recognize facial features of each of the plurality of faces in the image, and determine node identity information corresponding to the facial features according to the recognized facial features, where one worker thread recognizes facial features of one face. According to the recognized facial features, the node identity information corresponding to the facial features is determined. In this way, parallel operation of the plurality of worker threads can improve the processing efficiency of the computing node, thereby improving the processing efficiency of the entire identity determination system.

In an optional embodiment of the present disclosure, uploading the facial features and the node identity information corresponding to the facial features to the server in step S306 above may be uploading in real time. The facial features and the node identity information corresponding to the facial features are uploaded to the server in real time after determining the node identity information corresponding to the facial features.

In an optional embodiment of the present disclosure, uploading the facial features and the node identity information corresponding to the facial features to the server in step S306 above may also be uploading according to the preset upload frequency. The facial features and the node identity information corresponding to the facial features are stored locally after the node identity information corresponding to the facial features is determined; and the facial features and the node identity information corresponding to the facial features stored locally are uploaded to the server according to the preset upload frequency.

The preset upload frequency here can be set according to actual requirements. For example, the preset upload frequency can be uploading every 1 minute or every 2 minutes. It should be noted that the examples here are only illustrative and are not limitative of the examples of the present disclosure.

In an optional embodiment of the present disclosure, uploading the facial features and the node identity information corresponding to the facial features stored locally to the server according to the preset upload frequency may include: uploading the facial features and the node identity information corresponding to the facial features stored locally to the server according to the preset upload frequency, and locally deleting the facial features uploaded to the server and the node identity information corresponding to the facial features uploaded to the server. In this way, local storage space can be saved.

In an optional embodiment of the present disclosure, uploading the facial features and the node identity information corresponding to the facial features stored locally to the server according to the preset upload frequency may include: uploading the facial features and the node identity information corresponding to the facial features stored locally to the server according to the preset upload frequency, and generating an upload log, so that subsequent facial features and node identity information corresponding to the facial features which are stored locally and non-uploaded to the server are uploaded to the server according to the upload log. In this way, the problem of repeated upload can be avoided, transmission resources can be saved, and the processing efficiency of the server can be improved.

In an optional embodiment of the present disclosure, subsequent to determining the node identity information corresponding to the facial features in step S304 above, the node identity information, time of occurrence of the node identity information, and face center coordinates corresponding to the node identity information may be stored in the local node log table for subsequent use. For example, the problem that different node identity information may be determined when the person is within the specified range of the same location point due to the angle of face and the light can be solved. For another example, the valid identity information in the node identity information corresponding to a single node can be determined, so as to be used for statistics of the user staying in the scene when applied to an actual scene, and so on. Details are described in the following.

In an optional embodiment of the present disclosure, if there is different node identity information stored in the local node log table, the different node identity information is recorded as first node identity information and second node identity information, and the examples of the present disclosure may further include the following steps:

querying face center coordinates and time of occurrence corresponding to the first node identity information and face center coordinates and time of occurrence corresponding to the second node identity information from the node log table;

determining whether an offset of the face center coordinates corresponding to the second node identity information with respect to the face center coordinates corresponding to the first node identity information is less than a preset number of pixels; and if yes, and frames of the second node identity information between identical first node identity information are less than preset frames, determining the first node identity information and the second node identity information as substantially identical node identity information and recording in a node identity information consolidation table.

It can be seen that the example can solve the problem that different node identity information may be determined when the person is within the specified range of the same location point due to the angle of face and the light. That is, the above steps are referred to as T-type algorithm, and there are three conditions of the T-type algorithm:

1) If there is different node identity information in the node log table, the different node identity information is recorded as the first node identity information and the second node identity information;

2) The offset of the face center coordinates corresponding to the second node identity information with respect to the face center coordinates corresponding to the first node identity information is less than the preset number of pixels.

Figure 4:
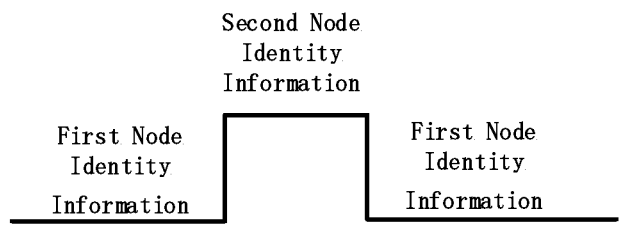
FIG. 4 is a schematic diagram of T-shaped regularity of node identity information according to an embodiment of the present disclosure.

3) The changing regularity of the node identity information is in accordance with the trapezoidal regularity, as illustrated in FIG. 4.

When the conditions 1) and 2) are satisfied, if the changing regularity of the node identity information is as illustrated in the condition 3), and the number of frames of the second node identity information between the same first node identity information is less than a preset frame number, the first node identity information and the second node identity information are determined to be the same node identity information, which can be used to improve the accuracy of the system.

The preset number here can be set according to actual requirements, such as 10, etc.; and the preset frame number can also be set according to actual requirements, such as 4, etc. It should be noted that the examples here are only illustrative and are not limitative of the examples of the present disclosure.

Figure 5:
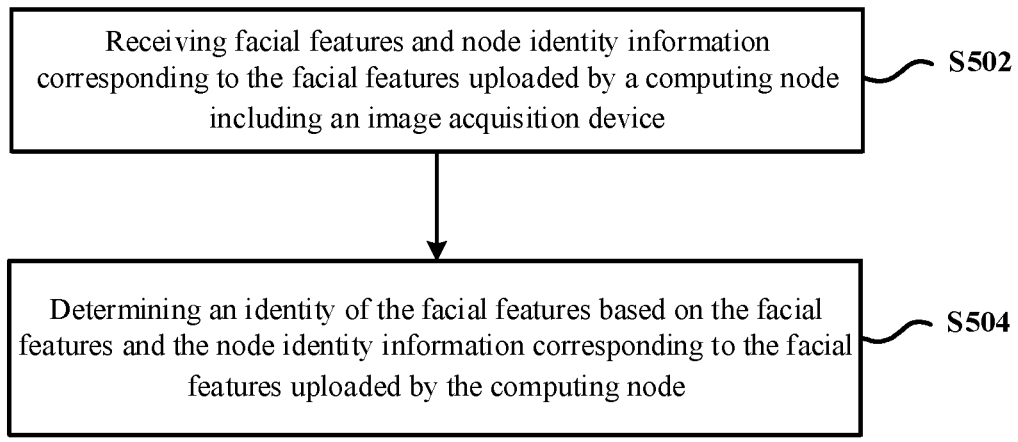
FIG. 5 is a schematic flow chart of an identity determination method adapted for a server according to an embodiment of the present disclosure.

Based on the same inventive concept, the examples of the present disclosure further provide an identity determination method. FIG. 5 is a schematic flow chart of an identity determination method adapted for a server according to an embodiment of the present disclosure. With reference to FIG. 5, the identity determination method adapted for the server may include the following steps S502 to S504.

Step S502: receiving facial features and node identity information corresponding to the facial features which are uploaded by a computing node including an image acquisition device, where the computing node uses the image acquisition device to collect an image according to a preset image collecting frequency; performs face recognition on the collected image to recognize facial features in the image, and determines node identity information corresponding to the facial features according to the recognized facial features; and uploads the facial features and the node identity information corresponding to the facial features to the server.

Step S504: determining an identity of the facial features based on the facial features and the node identity information corresponding to the facial features which are uploaded by the computing node.

In an optional embodiment of the present disclosure, if the number of computing nodes is one, determining the identity of the facial features based on the facial features and the node identity information corresponding to the facial features which are uploaded by the computing node in step S504 may include: determining whether the amount of the node identity information is greater than the preset amount threshold according to the node log table uploaded by the computing node. If the amount of the node identity information determined by the computing node within a preset duration T is greater than the preset amount threshold M, the node identity information is determined as valid identity information. For example, if the amount of the node identity information determined within a preset duration of 10 seconds is greater than the preset amount threshold of 7, the node identity information is determined as valid identity information. It should be noted that T and M can be set according to actual requirements, and the examples here are only illustrative and are not limitative of the examples of the present disclosure.

In this way, the server can further count the number of people based on the valid identity information. For example, if the image acquisition device of the computing node is used to collect the image of the mall, the server can count the passenger flow of the mall based on the valid identity information. For another example, the image acquisition device of the computing node is used to collect the image of the shop in the mall, the server can count the passenger flow of the shop in the mall based on the valid identity information. It should be noted that the mall provided here is only illustrative, and the user can dispose the identity determination system provided by the examples of the present disclosure in corresponding scenes according to actual requirements, such as popular attractions, public places, etc., so as to use the identity determination system to implement identity determination, thereby implementing the statistics of the passenger flow of the scene and the hot spot detection according to the determined identity.

In an application scene, when an exhibition or product is displayed, it is usually required to know the attention of visitors to the product or exhibits. Therefore, it is usually required to count the visitors who have stayed, without counting those who have not stayed. It can be implemented by the following steps:

using the image acquisition device of the computing node to collect the image of the exhibition or product on display, performing face recognition on the collected image, recognizing facial features in the image, determining node identity information corresponding to the facial features according to the recognized facial features, and then storing the node identity information, time of occurrence of the node identity information, and face center coordinates corresponding to the node identity information in the local node log table; and the computing node uploading its own node log table to the server.

The server may determine whether the amount of the node identity information is greater than the preset amount threshold according to the node log table uploaded by the computing node, and if the amount of the node identity information determined by the computing node within the preset duration T is greater than the preset amount threshold M, the node identity information is determined as valid identity information. For example, if the amount of the node identity information determined within a preset duration of 10 seconds is greater than the preset amount threshold of 7, the node identity information is determined as valid identity information. Therefore, the server can count the visitors who have stayed based on the valid identity information.

In an optional embodiment of the present disclosure, if the number of computing nodes is more than one, step S504 may include: matching the facial features uploaded by the computing nodes with the node identity information corresponding to the facial features to perform node identity information matching between the computing nodes. Still by taking the above example as an example, the node identity information corresponding to the facial features a on the computing node A is node A-a, the node identity information corresponding to the facial features a on the computing node B is node B-a, and the server may determine node identity information node A-a and node B-a as the same person according to the facial features a, and assign unified determination identity information as gid-a. Step S504 can be implemented by the following steps:

assigning identical determination identity information for node identity information of identical facial features, and establishing a mapping relationship of the determination identity information, facial features and node identity information according to facial features and node identity information corresponding to the facial features uploaded by a plurality of computing nodes; and querying node identity information substantially identical to each node identity information in the node identity information consolidation table uploaded by the computing nodes according to each node identity information in the mapping relationship, and adding the substantially identical node identity information to the mapping relationship.

In an optional embodiment of the present disclosure, when the server receives again facial features and node identity information corresponding to the facial features are uploaded by any one of the plurality of computing nodes, the server can further determine whether there is node identity information identical to the uploaded node identity information in the mapping relationship; if yes, the server determines determination identity information corresponding to the identical node identity information as a determination identity of the uploaded node identity information according to the mapping relationship; and if not, the sever assigns new determination identity information different from determination identity information contained in the mapping relationship, determines the new determination identity information as the determination identity of the uploaded node identity information, and records the new determination identity information, the uploaded node identity information and corresponding facial features in the mapping relationship.

In an optional embodiment of the present disclosure, the plurality of computing nodes upload node log tables to the server, respectively, and when the server receives again facial features and node identity information corresponding to the facial features uploaded by any one of the plurality of computing nodes, according to the node log table of the any one of the plurality of computing nodes, if an amount of the node identity information of the any one of the computing nodes determined within a preset duration is greater than a preset amount threshold, the server determines the node identity information as valid identity information and further determines whether there is node identity information identical to the valid identity information in the mapping relationship; if yes, the server determines determination identity information corresponding to the identical node identity information as a determination identity of the valid identity information according to the mapping relationship; and if not, the server assigns new determination identity information different from determination identity information contained in the mapping relationship, determines the new determination identity information as the determination identity of the valid identity information, and records the new determination identity information, the valid identity information and corresponding facial features in the mapping relationship.

In an optional embodiment of the present disclosure, the server can further determine the validity of the node identity information in the initial mapping relationship established according to the respective node log tables of the plurality of computing nodes; if the node identity information is valid, the node identity information is reserved; and if the node identity information is not valid, the node identity information is deleted.

In an optional embodiment of the present disclosure, the server may further query, according to the node identity information corresponding to the new determination identity information in the mapping relationship, node identity information substantially identical to the node identity information corresponding to the new determination identity information in the node identity information consolidation table, and add the substantially identical node identity information to the mapping relationship.

In this way, the server can further count the number of people based on the determination identity information. For example, the image acquisition devices of the plurality of computing nodes are used to collect the image of the mall, the server can count the passenger flow of the mall based on the determination identity information. For another example, the image acquisition devices of the plurality of computing nodes are used to collect the image of the shop in the mall, the server can count the passenger flow of the shop in the mall based on the determination identity information. It should be noted that the mall provided here is only illustrative, and the user can dispose the identity determination system provided by the examples of the present disclosure in corresponding scenes according to actual requirements, such as popular attractions, public places, etc., so as to use the identity determination system to implement identity determination, thereby implementing the statistics of the passenger flow of the scene and the hot spot detection according to the determined identity.

Figure 6:
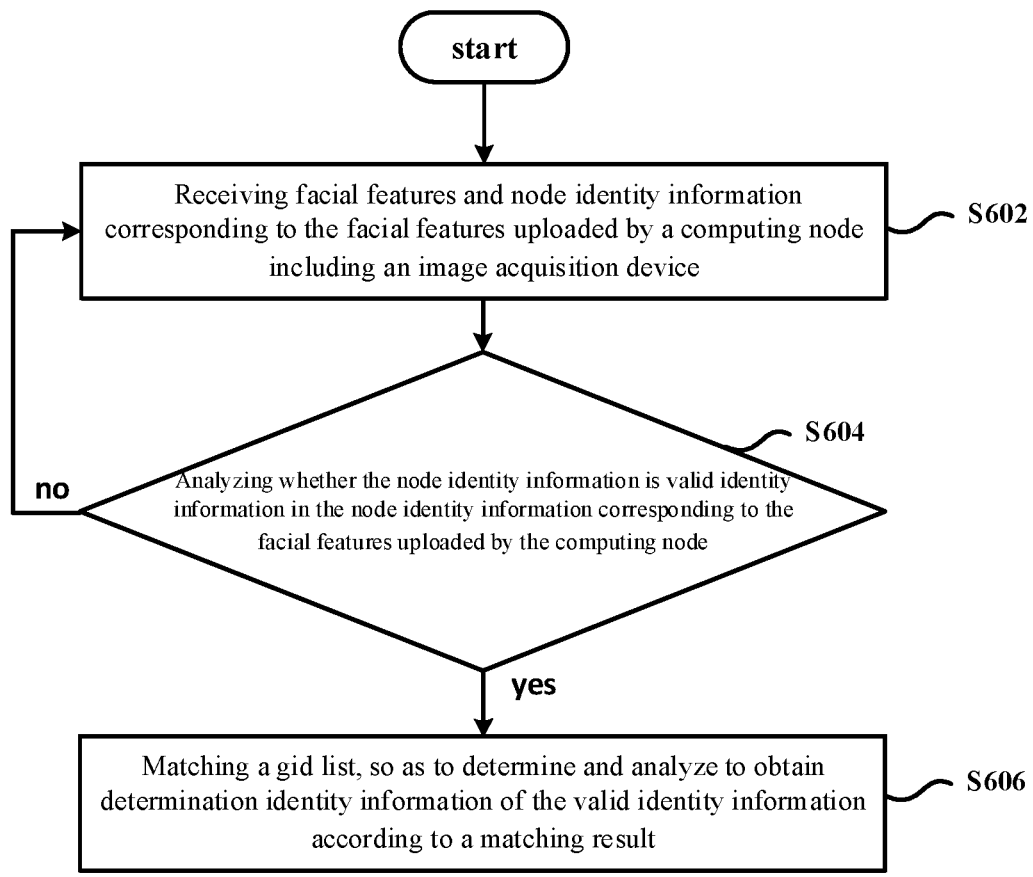
FIG. 6 is a schematic flow chart of an identity determination method adapted for a server according to another embodiment of the present disclosure.

FIG. 6 is a schematic flow chart of an identity determination method adapted for a server according to another embodiment of the present disclosure. With reference to FIG. 6, the identity determination method adapted for the server may include the following steps S602 to S606.

Step S602: receiving facial features and node identity information corresponding to the facial features uploaded by a computing node including an image acquisition device, where the computing node uses the image acquisition device to collect an image according to a preset image collecting frequency, performs face recognition on the collected image to recognize facial features in the image, determines node identity information corresponding to the facial features according to the recognized facial features, and then uploads the facial features and the node identity information corresponding to the facial features to the server.

Step S604: analyzing whether the node identity information is valid identity information in the node identity information corresponding to the facial features uploaded by the computing node; if yes, continuing to perform step S606; and if not, returning to step S602.

In this step, according to the node log table of the computing node, if the amount of the node identity information determined by the computing node within a preset duration T is greater than the preset amount threshold M, the node identity information is determined as valid identity information. For example, if the amount of the node identity information determined within a preset duration of 10 seconds is greater than the preset amount threshold of 7, the node identity information is determined as valid identity information. It should be noted that T and M can be set according to actual requirements, and the examples here are only illustrative and are not limitative of the examples of the present disclosure.

Step S606: matching a gid list, so as to determine and analyze to obtain determination identity information of the valid identity information according to a matching result.

In this step, the gid list includes the mapping relationship of the determination identity information, facial features and node identity information. It can be determined whether there is node identity information identical to the valid identity information in the mapping relationship. If yes, the determination identity information corresponding to the node identity information is used as the determination identity of the valid identity information according to the mapping relationship; and if not, new determination identity information different from the determination identity information contained in the mapping relationship is assigned, the new determination identity information is used as the determination identity of the valid identity information, and the new determination identity information, the valid identity information and corresponding facial features are recorded in the mapping relationship.

In an optional embodiment of the present disclosure, the node identity information substantially identical to the node identity information corresponding to the new determination identity information in the node identity information consolidation table may further be queried according to the node identity information corresponding to the new determination identity information in the mapping relationship, and the substantially identical node identity information may be added to the mapping relationship.

According to any one of the foregoing optional example or a combination of a plurality of optional example, the examples of the present disclosure can achieve the following beneficial effects.

The identity determination system provided by the examples of the present disclosure includes a computing node including an image acquisition device, and a server in communication connection with the computing node. After the computing node collects an image and performs face recognition on the image, facial features are extracted and analysis data is uploaded to the server. The server performs feature matching and correlation to implement identity determination of the facial features. Thus, the distributed computation of the computing node and the server improves the efficiency and security of the system.

In addition, in the examples of the present disclosure, at the computing node, the node identity information determined by recognizing facial features is further analyzed on the basis of the image analysis algorithm for face recognition, so as to solve the problem that different node identity information may be determined when the person is within the specified range of the same location point due to the angle of face and the light, thereby improving the accuracy of computing node recognition, and thus improving the accuracy of identity determination of the entire system.

Further, in the examples of the present disclosure, at the server, by determining the validity of the node identity information of the computing node, the problem that different node identity information may be determined when the person is within the specified range of the same location point due to the angle of face and the light is solved, thereby improving the accuracy of identity determination of the entire system.

The present disclosure is proposed to provide an identity determination system and an identity determination method. The identity determination system improves the efficiency and security of the system through distributed computation of the computing node and the server.

The examples of the present disclosure provide an identity determination system, including: a computing node including an image acquisition device, and a server in communication connection with the computing node;

the computing node is configured to: collect, by using the image acquisition device, an image according to a preset image collecting frequency; perform face recognition on the collected image to recognize a facial feature in the image; determine node identity information corresponding to the recognized facial feature according to the recognized facial feature; and upload the facial feature and the node identity information corresponding to the facial feature to the server; and the server is configured to determine an identity of the facial feature based on the facial feature and the node identity information corresponding to the facial feature uploaded by the computing node.

Optionally, the computing node is further configured to:

use the recognized facial feature to match a facial feature in a correspondence between facial features and node identity information;

in a case where there is a matched facial feature in the correspondence, determine node identity information corresponding to the matched facial feature in the correspondence as node identity information corresponding to the recognized facial feature; and in a case where there is no matched facial feature in the correspondence, assign new node identity information different from the node identity information contained in the correspondence, determine the new node identity information as the node identity information corresponding to the recognized facial feature, and record the new node identity information and a facial feature corresponding to the new node identity information in the correspondence.

Optionally, the computing node is further configured to:

store the node identity information, time of occurrence of the node identity information, and a face center coordinate corresponding to the node identity information in a local node log table, subsequent to determining the node identity information corresponding to the facial feature.

Optionally, the computing node is further configured to:

in a case where there is different node identity information in the node log table, record the different node identity information as first node identity information and second node identity information;

query a face center coordinate and time of occurrence corresponding to the first node identity information and a face center coordinate and time of occurrence corresponding to the second node identity information from the node log table;

determine whether an offset of the face center coordinate corresponding to the second node identity information with respect to the face center coordinate corresponding to the first node identity information is less than a preset number of pixels; and if yes, and a number of frames of the second node identity information between identical first node identity information is less than a preset frame number, determine the first node identity information and the second node identity information as substantially identical node identity information, and record the first node identity information and the second node identity information in a node identity information consolidation table.

Optionally, the server is further configured to:

assign identical determination identity information for node identity information of an identical facial feature, according to facial features and node identity information corresponding to the facial features uploaded by a plurality of computing nodes, and establish a mapping relationship of the determination identity information, the facial feature and the node identity information; and query, according to each node identity information in the mapping relationship, node identity information substantially identical to each node identity information in the node identity information consolidation table uploaded by the plurality of computing nodes, and add the substantially identical node identity information to the mapping relationship.

Optionally, the server is further configured to:

determine whether there is node identity information identical to the uploaded node identity information in the mapping relationship, when receiving again a facial feature and node identity information corresponding to the facial feature uploaded by any one of the plurality of computing nodes; if yes, use determination identity information corresponding to the identical node identity information as a determination identity of the uploaded node identity information according to the mapping relationship; and if not, assign new determination identity information different from determination identity information contained in the mapping relationship, use the new determination identity information as the determination identity of the uploaded node identity information, and record the new determination identity information, the uploaded node identity information and a corresponding facial feature in the mapping relationship.

Optionally, the computing node is further configured to upload the node log table to the server; and the server is further configured to: when receiving again a facial feature and node identity information corresponding to the facial feature uploaded by any one of the plurality of computing nodes, in a case where an amount of identical node identity information determined by the any one of the plurality of computing nodes within a preset duration is greater than a preset threshold according to the node log table, determine the identical node identity information as valid identity information; and determine whether there is node identity information identical to the valid identity information in the mapping relationship, if yes, use determination identity information corresponding to the identical node identity information as a determination identity of the valid identity information according to the mapping relationship, and if not, assign new determination identity information different from determination identity information contained in the mapping relationship, use the new determination identity information as the determination identity of the valid identity information, and record the new determination identity information, the valid identity information and a corresponding facial feature in the mapping relationship.

Optionally, the server is further configured to:

query, according to node identity information corresponding to new determination identity information in the mapping relationship, node identity information substantially identical to the node identity information corresponding to the new determination identity information in the node identity information consolidation table, and add the substantially identical node identity information to the mapping relationship.

Optionally, the computing node is further configured to:

start a plurality of worker threads, in a case where a plurality of faces are detected in the image when the face recognition is performed on the collected image, wherein a number of the plurality of worker threads is identical to a number of the plurality of faces;

and use the plurality of worker threads to recognize a facial feature of each of the plurality of faces in the image, and determine node identity information corresponding to the recognized facial feature according to the recognized facial feature, wherein one worker thread recognizes a facial feature of one face.

Optionally, the computing node is further configured to:

upload a facial feature and node identity information corresponding to the facial feature stored locally to the server according to a preset upload frequency and generate an upload log, so that a subsequent facial feature and node identity information corresponding to the subsequent facial feature stored locally and non-uploaded to the server are uploaded to the server according to the upload log.

The examples of the present disclosure further provide an identity determination method, adapted for a computing node including an image acquisition device, the identity determination method including:

using the image acquisition device to collect an image according to a preset image collecting frequency;

performing face recognition on the collected image to recognize facial feature in the image, and determining node identity information corresponding to the recognized facial feature according to the recognized facial feature; and uploading the facial feature and the node identity information corresponding to the facial feature to the server, so that the server determines an identity of the facial feature based on the facial feature and the node identity information corresponding to the facial feature uploaded by the computing node.

Optionally, the determining the node identity information corresponding to the facial feature according to the recognized facial feature includes:

using the recognized facial feature to match a facial feature in a correspondence between facial features and node identity information;

in a case where there is a matched facial feature in the correspondence, determining node identity information corresponding to the matched facial feature in the correspondence as node identity information corresponding to the recognized facial feature; and in a case where there is no matched facial feature in the correspondence, assigning new node identity information different from the node identity information contained in the correspondence, determining the new node identity information as the node identity information corresponding to the recognized facial feature, and recording the new node identity information and a facial feature corresponding to the new node identity information in the correspondence.

Optionally, subsequent to determining the node identity information corresponding to the facial features, the method further includes:

storing the node identity information, time of occurrence of the node identity information, and a face center coordinate corresponding to the node identity information in a local node log table.

Optionally, the method further includes:

in a case where there is different node identity information in the node log table, recording the different node identity information as first node identity information and second node identity information;

querying a face center coordinate and time of occurrence corresponding to the first node identity information and a face center coordinate and time of occurrence corresponding to the second node identity information from the node log table;

determining whether an offset of the face center coordinate corresponding to the second node identity information with respect to the face center coordinate corresponding to the first node identity information is less than a preset number of pixels; and if yes, and a number of frames of the second node identity information between identical first node identity information is less than a preset frame number, determining the first node identity information and the second node identity information as substantially identical node identity information and recording the first node identity information and the second node identity information in a node identity information consolidation table.

Optionally, the method further includes:

uploading the node log table and the node identity information consolidation table to the server.

Optionally, the performing face recognition on the collected image to recognize the facial feature in the image, determining the node identity information corresponding to the recognized facial feature according to the recognized facial feature includes:

starting a plurality of worker threads, in a case where a plurality of faces are detected in the image when the face recognition is performed on the collected image, wherein a number of the plurality of worker threads is identical to a number of the plurality of faces; and using the plurality of worker threads to recognize a facial feature of each of the plurality of faces in the image, and determining node identity information corresponding to the recognized facial feature according to the recognized facial feature, wherein one worker thread recognizes a facial feature of one face.

Optionally, the uploading the facial feature and the node identity information corresponding to the facial feature to the server includes:

uploading a facial feature and node identity information corresponding to the facial feature stored locally to the server according to a preset upload frequency and generating an upload log, so that a subsequent facial feature and node identity information corresponding to the subsequent facial feature stored locally and non-uploaded to the server are uploaded to the server according to the upload log.

The examples of the present disclosure further provide an identity determination method, adapted for the server, the identity determination method including:

receiving a facial feature and node identity information corresponding to the facial feature uploaded by a computing node comprising an image acquisition device, wherein the computing node uses the image acquisition device to collect an image according to a preset image collecting frequency; performs face recognition on the collected image to recognize a facial feature in the image, and determines node identity information corresponding to the recognized facial feature according to the recognized facial feature; uploads the facial feature and the node identity information corresponding to the facial feature to the server; and determining an identity of the facial feature based on the facial feature and the node identity information corresponding to the facial feature uploaded by the computing node.

Optionally, the determining the identity of the facial feature based on the facial feature and the node identity information corresponding to the facial feature uploaded by the computing node includes:

assigning identical determination identity information for node identity information of an identical facial feature, according to a facial feature and node identity information corresponding to the facial feature uploaded by a plurality of computing nodes, and establishing a mapping relationship of the determination identity information, the facial feature and the node identity information; and querying, according to each node identity information in the mapping relationship, node identity information substantially identical to each node identity information in the node identity information consolidation table uploaded by the plurality of computing nodes, and adding the substantially identical node identity information to the mapping relationship.

Optionally, the determining the identity of the facial feature based on the facial feature and the node identity information corresponding to the facial feature uploaded by the computing node includes:

determining whether there is node identity information identical to the uploaded node identity information in the mapping relationship, when receiving again a facial feature uploaded and node identity information corresponding to the facial feature by any one of the plurality of computing nodes; if yes, using determination identity information corresponding to the identical node identity information as a determination identity of the uploaded node identity information according to the mapping relationship; and if not, assigning new determination identity information different from determination identity information contained in the mapping relationship, using the new determination identity information as the determination identity of the uploaded node identity information, and recording the new determination identity information, the uploaded node identity information and a corresponding facial feature in the mapping relationship.

Optionally, the determining the identity of the facial feature based on the facial feature and the node identity information corresponding to the facial feature uploaded by the computing node includes:

when receiving again a facial feature and node identity information corresponding to the facial feature uploaded by any one of the plurality of computing nodes, in a case where an amount of the node identity information determined by the any one of the computing nodes within a preset duration is greater than a preset threshold according to the node log table uploaded by the computing node, determining the node identity information as valid identity information, and determining whether there is node identity information identical to the valid identity information in the mapping relationship; if yes, using determination identity information corresponding to the identical node identity information as a determination identity of the valid identity information according to the mapping relationship; and if not, assigning new determination identity information different from determination identity information contained in the mapping relationship, using the new determination identity information as the determination identity of the valid identity information, and recording the new determination identity information, the valid identity information and a corresponding facial feature in the mapping relationship.

Optionally, the method further includes:

querying, according to the node identity information corresponding to the new determination identity information in the mapping relationship, node identity information substantially identical to the node identity information corresponding to the new determination identity information in the node identity information consolidation table, and adding the substantially identical node identity information to the mapping relationship.

The identity determination system provided by the examples of the present disclosure includes a computing node including an image acquisition device, and a server in communication connection with the computing node. After the computing node collects an image and performs face recognition on the image, facial features are extracted and analysis data is uploaded to the server. The server performs feature matching and correlation to implement identity determination of the facial features. Thus, the distributed computation of the computing node and the server improves the efficiency and security of the system.

In addition, in the examples of the present disclosure, at the computing node, the node identity information determined by recognizing facial features is further analyzed on the basis of the image analysis algorithm for face recognition, so as to solve the problem that different node identity information may be determined when the person is within the specified range of the same location point due to the angle of face and the light, thereby improving the accuracy of computing node recognition, and thus improving the accuracy of identity determination of the entire system.

Further, in the examples of the present disclosure, at the server, by determining the validity of the node identity information of the computing node, the problem that different node identity information may be determined when the person is within the specified range of the same location point due to the angle of face and the light is solved, thereby improving the accuracy of identity determination of the entire system.

The above description is only a summary of the technical solutions of the present disclosure. In order to more clearly understand the technical solutions of the present disclosure, the technical solutions of the present disclosure can be implemented in accordance with the content of the specification.

Based on the detailed description of examples of the present disclosure in connection with the accompanying drawings herein, those skilled in the art may understand the above and other objects, advantages, and features of the present disclosure more clearly and fully.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above-mentioned example further describe the purpose, technical solutions and beneficial effects of the present disclosure in detail. It should be understood that what have been described above are only implementations of the present disclosure and are not limitative of the present disclosure, and based on the described example herein, those skilled in the art can obtain other embodiment(s), without any inventive work, which should be within the protection scope of the present disclosure.

What is claimed is:

1. An identity determination system, comprising:
   a computing node comprising an image acquisition device, and a server in communication connection with the computing node, wherein the computing node is configured to:
   collect, by using the image acquisition device, an image according to a preset image collecting frequency;
   perform face recognition on the collected image to recognize a facial feature in the image;
   determine node identity information corresponding to the recognized facial feature according to the recognized facial feature, wherein a new node identity information is assigned in a case where there is no matched facial feature in the correspondence; and
   upload the facial feature and the node identity information corresponding to the facial feature to the server; and
   the server is configured to:
   determine an identity of the facial feature based on the facial feature and the node identity information corresponding to the facial feature uploaded by the computing node.

2. The system according to claim 1, wherein:
the computing node is further configured to:
  use the recognized facial feature to match a facial feature in a correspondence between facial features and node identity information;
  in a case where there is a matched facial feature in the correspondence, determine node identity information corresponding to the matched facial feature in the correspondence as node identity information corresponding to the recognized facial feature; and
  in a case where there is no matched facial feature in the correspondence, assign the new node identity information different from the node identity information contained in the correspondence, determine the new node identity information as the node identity information corresponding to the recognized facial feature, and record the new node identity information and a facial feature corresponding to the new node identity information in the correspondence.

3. The system according to claim 1, wherein the computing node is further configured to:
  after determining the node identity information corresponding to the facial feature, store the node identity information, time of occurrence of the node identity information, and a face center coordinate corresponding to the node identity information in a local node log table.

4. The system according to claim 3, wherein the computing node is further configured to:
  in a case where there is different node identity information in the node log table, record the different node identity information as first node identity information and second node identity information;
  query a face center coordinate and time of occurrence corresponding to the first node identity information and a face center coordinate and time of occurrence corresponding to the second node identity information from the node log table;
  determine whether an offset of the face center coordinate corresponding to the second node identity information with respect to the face center coordinate corresponding to the first node identity information is less than a preset number of pixels; and
  when the offset of the face center coordinate corresponding to the second node identity information with respect to the face center coordinate corresponding to the first node identity information is less than the preset number of pixels, and a number of frames of the second node identity information between identical first node identity information is less than a preset frame number, determine the first node identity information and the second node identity information as substantially identical node identity information, and record the first node identity information and the second node identity information in a node identity information consolidation table.

5. The system according to claim 4, wherein the server is further configured to:
  assign identical determination identity information for node identity information of an identical facial feature according to facial features and node identity information corresponding to the facial features uploaded by a plurality of computing nodes, and establish a mapping relationship of the determination identity information, the facial feature and the node identity information; and
  query, according to each node identity information in the mapping relationship, node identity information substantially identical to each node identity information in the node identity information consolidation table uploaded by the plurality of computing nodes, and add the substantially identical node identity information to the mapping relationship.

6. The system according to claim 5, wherein the server is further configured to:
  determine whether there is node identity information identical to uploaded node identity information in the mapping relationship when receiving a facial feature and node identity information corresponding to the facial feature uploaded by any one of the plurality of computing nodes again;
  when there is the node identity information identical to the uploaded node identity information in the mapping relationship, use determination identity information corresponding to the identical node identity information as a determination identity of the uploaded node identity information according to the mapping relationship; and
  when there is no node identity information identical to the uploaded node identity information in the mapping relationship, assign new determination identity information different from determination identity information contained in the mapping relationship, use the new determination identity information as the determination identity of the uploaded node identity information, and record the new determination identity information, the uploaded node identity information and a corresponding facial feature in the mapping relationship.

7. The system according to claim 5, wherein:
the computing node is further configured to upload the node log table to the server; and the server is further configured to:
  when receiving a facial feature and node identity information corresponding to the facial feature uploaded by any one of the plurality of computing nodes again, and in a case where an amount of identical node identity information determined by the any one of the plurality of computing nodes within a preset duration is greater than a preset threshold according to the node log table, determine the identical node identity information as valid identity information; and determine whether there is node identity information identical to the valid identity information in the mapping relationship,
  when there is the node identity information identical to the valid identity information in the mapping relationship, use determination identity information corresponding to the identical node identity information as a determination identity of the valid identity information according to the mapping relationship, and
  when there is no node identity information identical to the valid identity information in the mapping relationship, assign new determination identity information different from determination identity information contained in the mapping relationship, use the new determination identity information as the determination identity of the valid identity information, and record the new determination identity information, the valid identity information and a corresponding facial feature in the mapping relationship.

8. The system according to claim 6, wherein the server is further configured to:
  query, according to node identity information corresponding to new determination identity information in the mapping relationship, node identity information substantially identical to the node identity information corresponding to the new determination identity information in the node identity information consolidation table, and add the substantially identical node identity information to the mapping relationship.

9. The system according to claim 1, wherein the computing node is further configured to:

start a plurality of worker threads in a case where a plurality of faces are detected in the image when the face recognition is performed on the collected image, and wherein a number of the plurality of worker threads is identical to a number of the plurality of faces; and use the plurality of worker threads to recognize a facial feature of each of the plurality of faces in the image, and determine node identity information corresponding to the recognized facial feature according to the recognized facial feature, and wherein one worker thread recognizes a facial feature of one face.

10. The system according to claim 1, wherein the computing node is further configured to:

upload a facial feature and node identity information corresponding to the facial feature stored locally to the server according to a preset upload frequency and generate an upload log, so that a subsequent facial feature and node identity information corresponding to the subsequent facial feature stored locally and non-uploaded to the server are uploaded to the server according to the upload log.

11. An identity determination method, adapted for a computing node comprising an image acquisition device, comprising:

using the image acquisition device to collect an image according to a preset image collecting frequency;

performing face recognition on the collected image to recognize facial feature in the image, and determining node identity information corresponding to the recognized facial feature according to the recognized facial feature, wherein a new node identity information is assigned in a case where there is no matched facial feature in the correspondence; and uploading the facial feature and the node identity information corresponding to the facial feature to the server, so that the server determines an identity of the facial feature based on the facial feature and the node identity information corresponding to the facial feature uploaded by the computing node.

12. The method according to claim 11, wherein determining the node identity information corresponding to the facial feature according to the recognized facial feature comprises:

in a case where there is a matched facial feature in the correspondence, determining node identity information corresponding to the matched facial feature in the correspondence as node identity information corresponding to the recognized facial feature; and in a case where there is no matched facial feature in the correspondence, assigning the new node identity information different from the node identity information contained in the correspondence, determining the new node identity information as the node identity information corresponding to the recognized facial feature, and recording the new node identity information and a facial feature corresponding to the new node identity information in the correspondence.

13. The method according to claim 11, after determining the node identity information corresponding to the facial feature, further comprising:

storing the node identity information, time of occurrence of the node identity information, and a face center coordinate corresponding to the node identity information in a local node log table.

14. The method according to claim 13, further comprising:

in a case where there is different node identity information in the node log table, recording the different node identity information as first node identity information and second node identity information;

querying a face center coordinate and time of occurrence corresponding to the first node identity information and a face center coordinate and time of occurrence corresponding to the second node identity information from the node log table;

determining whether an offset of the face center coordinate corresponding to the second node identity information with respect to the face center coordinate corresponding to the first node identity information is less than a preset number of pixels; and when the offset of the face center coordinate corresponding to the second node identity information with respect to the face center coordinate corresponding to the first node identity information is less than the preset number of pixels, and a number of frames of the second node identity information between identical first node identity information is less than a preset frame number, determining the first node identity information and the second node identity information as substantially identical node identity information and recording the first node identity information and the second node identity information in a node identity information consolidation table.

15. The method according to claim 11, wherein performing the face recognition on the collected image to recognize the facial feature in the image, and determining the node identity information corresponding to the recognized facial feature according to the recognized facial feature comprises:

starting a plurality of worker threads in a case where a plurality of faces are detected in the image when the face recognition is performed on the collected image, and wherein a number of the plurality of worker threads is identical to a number of the plurality of faces; and using the plurality of worker threads to recognize a facial feature of each of the plurality of faces in the image, and determining node identity information corresponding to the recognized facial feature according to the recognized facial feature, and wherein one worker thread recognizes a facial feature of one face.

16. The method according to claim 11, wherein uploading the facial feature and the node identity information corresponding to the facial feature to the server comprises:

uploading a facial feature and node identity information corresponding to the facial feature stored locally to the server according to a preset upload frequency and generating an upload log, so that a subsequent facial feature and node identity information corresponding to the subsequent facial feature stored locally and non-uploaded to the server are uploaded to the server according to the upload log.

17. An identity determination method, adapted for a server, comprising:

receiving a facial feature and node identity information corresponding to the facial feature uploaded by a computing node comprising an image acquisition device, wherein the computing node uses the image acquisition device to collect an image according to a preset image collecting frequency;

performing face recognition on the collected image to recognize a facial feature in the image, and determining node identity information corresponding to the recognized facial feature according to the recognized facial feature, wherein a new node identity information is assigned in a case where there is no matched facial feature in the correspondence;

uploading the facial feature and the node identity information corresponding to the facial feature to the server; and determining an identity of the facial feature based on the facial feature and the node identity information corresponding to the facial feature uploaded by the computing node.

18. The method according to claim 17, wherein determining the identity of the facial feature based on the facial feature and the node identity information corresponding to the facial feature uploaded by the computing node comprises:

assigning identical determination identity information for node identity information of an identical facial feature according to a facial feature and node identity information corresponding to the facial feature uploaded by a plurality of computing nodes, and establishing a mapping relationship of the determination identity information, the facial feature and the node identity information; and querying, according to each node identity information in the mapping relationship, node identity information substantially identical to each node identity information in the node identity information consolidation table uploaded by the plurality of computing nodes, and adding the substantially identical node identity information to the mapping relationship.

19. The method according to claim 18, wherein determining the identity of the facial feature based on the facial feature and the node identity information corresponding to the facial feature uploaded by the computing node comprises:

determining whether there is node identity information identical to uploaded node identity information in the mapping relationship when receiving a facial feature uploaded and node identity information corresponding to the facial feature by any one of the plurality of computing nodes again;

when there is the node identity information identical to uploaded node identity information in the mapping relationship, using determination identity information corresponding to the identical node identity information as a determination identity of the uploaded node identity information according to the mapping relationship; and when there is no node identity information identical to uploaded node identity information in the mapping relationship, assigning the new determination identity information different from determination identity information contained in the mapping relationship, using the new determination identity information as the determination identity of the uploaded node identity information, and recording the new determination identity information, the uploaded node identity information and a corresponding facial feature in the mapping relationship.

20. The method according to claim 18, wherein determining the identity of the facial feature based on the facial feature and the node identity information corresponding to the facial feature uploaded by the computing node comprises:

when receiving a facial feature and node identity information corresponding to the facial feature uploaded by any one of the plurality of computing nodes again, and in a case where an amount of the node identity information determined by the any one of the computing nodes within a preset duration is greater than a preset threshold according to the node log table uploaded by the computing node, determining the node identity information as valid identity information, and determining whether there is node identity information identical to the valid identity information in the mapping relationship;

when there is the node identity information identical to the valid identity information in the mapping relationship, using determination identity information corresponding to the identical node identity information as a determination identity of the valid identity information according to the mapping relationship; and when there is no node identity information identical to the valid identity information in the mapping relationship, assigning new determination identity information different from determination identity information contained in the mapping relationship, using the new determination identity information as the determination identity of the valid identity information, and recording the new determination identity information, the valid identity information and a corresponding facial feature in the mapping relationship.

* * * * *